US012688395B2

(12) United States Patent
Li et al.

(10) Patent No.: US 12,688,395 B2
(45) Date of Patent: Jul. 21, 2026

(54) NEURAL NETWORK PROCESSOR WITH ON-CHIP CONVOLUTION KERNEL STORAGE

(71) Applicant: Wisconsin Alumni Research Foundation, Madison, WI (US)

(72) Inventors: Jing Li, Madison, WI (US); Jialiang Zhang, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 2142 days.

(21) Appl. No.: 15/887,367

(22) Filed: Feb. 2, 2018

(65) Prior Publication Data

US 2019/0244080 A1 Aug. 8, 2019

(51) Int. Cl.
*G06N 3/042* (2023.01)
*G06N 3/0464* (2023.01)
*G06N 3/063* (2023.01)
*G06N 3/08* (2023.01)

(52) U.S. Cl.
CPC ........... *G06N 3/042* (2023.01); *G06N 3/0464* (2023.01); *G06N 3/063* (2013.01); *G06N 3/08* (2013.01)

(58) Field of Classification Search
CPC ............ G06N 3/08; G06N 3/04; G06N 3/063; G06N 20/10; G06N 3/0481; G06V 10/764; H03M 7/42
See application file for complete search history.

(56) References Cited

U.S. PATENT DOCUMENTS

| | | | | |
|---|---|---|---|---|
| 8,779,950 | B2* | 7/2014 | Cuthbert, II ........ | H03M 7/3059 |
| | | | | 341/51 |
| 2003/0065631 | A1* | 4/2003 | McBride ................ | G06N 3/063 |
| | | | | 706/15 |
| 2016/0246603 | A1* | 8/2016 | Watanabe ............. | G06F 9/3004 |
| 2017/0039472 | A1* | 2/2017 | Kudo ..................... | G06N 3/063 |
| 2018/0101570 | A1* | 4/2018 | Kumar ............. | G06F 16/24537 |
| 2018/0189642 | A1* | 7/2018 | Boesch .................. | G06N 3/044 |
| 2021/0182077 | A1* | 6/2021 | Chen ......................... | G06T 7/20 |

OTHER PUBLICATIONS

Yuesheng Xu, et .al: Refinable Kernels*, Journal of Machine Learning Research 8 (2007) 2083-2120 (Year: 2007).*
Tiezheng Ge, et.al; Optimum Product Quantization, IEEE Transactions on Pattern Analysis and Machine Intelligence, vol. 36, No., 4, Apr. 2014 . (Year: 2014).*
Jorge Sanchez and Florent Perronnin,, High-Dimensional Signature Compression for Large-Scale Image Classification (Year: 2011).*

* cited by examiner

*Primary Examiner* — Li B. Zhen
*Assistant Examiner* — Tirumale K Ramesh
(74) *Attorney, Agent, or Firm* — Boyle Fredrickson, S.C.

(57) ABSTRACT

A neural network processor architecture provides decompression circuitry that can exploit patterns of data in kernel weights of a convolutional neural net as flattened to a vector, the compression allowing reduced kernel data storage costs including on-chip-storage.

13 Claims, 4 Drawing Sheets

NEURAL NETWORK PROCESSOR WITH ON-CHIP CONVOLUTION KERNEL STORAGE

STATEMENT REGARDING FEDERALLY SPONSORED RESEARCH OR DEVELOPMENT

N/A

CROSS REFERENCE TO RELATED APPLICATION

N/A

BACKGROUND OF THE INVENTION

The present invention relates generally to computer architectures and, in particular, to a computer architecture providing improved execution of convolution artificial neural networks (CNNs).

Artificial neural networks (henceforth neural network) are computing systems inspired by the brain. A common design of a neural network provides multiple layers of "neurons" where each layer has multiple connections to preceding and/or succeeding layers. Each of the multiple inputs to each neuron is associated with a weight, and the neuron provides an output that is a function of the weighted sum of the data from the input connections. The final layer of the neural network typically provides a classification, for example, expressed as an output vector having elements associated with different classification possibilities. In a common example, a neural network may be trained to review image data and classify that image data. In this case, the output vector may classify the image according to whether it shows a particular subject, for example, an automobile or a pedestrian.

The weights used by the neurons are obtained by a training process in which example data with known classification is provided in a "training set" to the neural network and the weights adjusted iteratively so that the output classification converges to the known classification of the training set data. This process may be conducted "off-line" before the neural network is used. After training, a neural network processor loaded with the trained weights may proceed to categorize data using those weights by passing data through the connections between neurons to the final classification layer.

A significant benefit to neural network architectures is that specific rules for the classifications of the data need not be developed by human programmers; instead, the neural network essentially develops its own rules based on the training process.

A variation in design of neural networks is a so-called "convolutional neural net" in which the neural network weights are expressed in the form of a kernel (typically a matrix of data) that is convolved over the input data to provide the values of the next neural network layer. A convolutional neural network is a special case of the general neural network in which the kernel essentially limits the connections of each neuron to a small portion of the input data and expresses a common weighting used by all the neurons of that layer with the differences between each neuron being the subset of the input data which it receives. A convolutional neural network may have multiple convolution layers and kernels.

It is important to note that neuron weights and in particular convolution kernels are generally not intelligible to a human observer. For example, convolution kernels generated to identify the subject of images are not images of those subjects or particular image classifications. Instead, the neuron weights are complex abstracted data representing a blending of information about multiple different classifications and largely unpredictable by the neural network designer.

Recent advances in neural network processing have relied on so-called "deep neural networks" having hundreds of layers. Such deep neural networks have exceeded human capabilities in many classification tasks but present challenges with respect to computational limits and data limits. This first challenge, of computational limits, is related to large number of computations required for the many neurons. This has led to the development of specialized processors optimized for the arithmetic operations of the neurons (e.g., matrix multiplications).

The second challenge of data limits is related to the large amount of data required to store the necessary kernels. Transferring this kernel data between memory and the neural network processor is time-consuming and consumes a significant proportion of the power needed for the neural network calculation. The problem of large amounts of kernel data has been addressed through the techniques of: (1) "pruning" in which connections between neurons having low weight values (and those neuron weights) are removed from the neural network calculation; (2) "quantizing" in which the kernel weights are quantized, for example, by turning floating-point values into scalar values or the like; and (3) "weight sharing" in which the values for different weights are shared, for example, by developing a "codebook" that compresses common weight values into shorter codes that can be looked up in the codebook with a more compact index number.

SUMMARY OF THE INVENTION

The prior art techniques of compressing the kernel data look at each data element in isolation consistent with an expectation that there is no predictable organizational pattern to that kernel data. Nevertheless, although kernel data is neither an image nor intelligible as an image, the present inventors have determined that there are underlying patterns of the kernel data that permit a pattern-based compression system. In particular, the present inventors have found that by flattening the kernel data into vectors, vector compression techniques yield substantial compressions of this data without countervailing loss of classification accuracy. The compression level is high enough to allow the weights to be stored on the same integrated circuit as that which does the neural network processing by incorporating into those integrated circuits vector decompression circuitry. The result of storing kernel data directly on the processing chip radically decreases the time and cost of managing weights for commercially significant artificial neural networks.

Specifically, then, the present invention provides a neural network processor operating to receive data and to classify that data and includes an input register holding received data for classification. The integrated circuit further includes a codebook storage memory holding data permitting a mapping of individual codeword values to patterns of multiple kernel weight values related to a kernel of a neural network trained to provide a set of classifications, and a codeword memory holding codeword data to provide generation of a reconstructed kernel by indexing the codebook storage memory with codeword data. Arithmetic circuitry communicating with the input register, the codebook storage memory, and the codeword memory generate output representing a dot product between the received data and the reconstructed kernel to classify the received data according to the set of classifications.

It is thus a feature of at least one embodiment of the invention to provide sufficient compression of neural network weight values by exploiting hidden patterns in that weight data to permit on-chip storage of neural weight values for higher processing speeds.

The patterns of multiple kernel weight values may be contiguous weight values within a matrix of the kernel.

It is thus a feature of at least one embodiment of the invention to identify patterns in the raw kernel values without extensive preprocessing, for example, application of image transformations, etc.

The patterns of multiple kernel weight values may further be contiguous weight values along a predetermined dimension of the kernel data.

It is thus a feature of at least one embodiment of the invention to identify patterns in the natural organization of the kernel data, for example, in rows and columns.

The patterns of multiple kernel weight values may have beginning and end of values aligned within the matrix of the kernel.

It is thus a feature of at least one embodiment of the invention to exploit patterns in the kernel data that are naturally registered to edges of the kernel.

The beginning and end values may extend at least a full dimension of the matrix of the kernel.

It is thus a feature of at least one embodiment of the invention to identify patterns that can be extracted through a simple flattening of the kernel into vectors.

The reconstructed kernel may be a scalar compression of the kernel of the neural network trained to provide the set of classifications. The scalar compression may replace a range of kernel data values with a predetermined scalar value.

It is thus a feature of at least one embodiment of the invention to permit further application of scalar compression to the compressed kernel for additional compression.

Alternatively, or in addition, the patterns of multiple kernel weight values may be stored as a product quantization of vectors of the kernel of the neural network. The product quantization may provide multiple individual codeword values associated with different but contiguous patterns of multiple kernel weights.

It is thus a feature of at least one embodiment of the invention to permit further application of product quantization to the compressed kernel for additional compression.

The arithmetic circuitry may employ the data of the codebook storage memory to precompute a set of multiplications between the received data and data of the codebook storage memory to populate a first lookup table and repeatedly use the precomputed set of multiplications according to data of the codeword memory in generation of the output representing a dot product between the received data and the reconstructed kernel.

It is thus a feature of at least one embodiment of the invention to provide calculation reuse substantially reducing the calculation overhead of neural network processing as is made practical by on-chip storage of the neural weights.

The arithmetic circuit may further include a second lookup table and further operate to populate the second lookup table with sums formed using the scalar-quantized codewords and the first lookup table, and may use the second lookup table and the product-quantized codewords to form the dot product.

It is thus a feature of at least one embodiment of the invention to permit reuse not only of multiplication operations but also of addition operations.

The data of the first and second lookup tables maybe stored for reuse between successive received data separated by a convolution of the kernel on an input data set.

It is thus a feature of at least one embodiment of the invention to increase the utilization of limited lookup tables by recognizing the regularity of the convolution process.

The input register, codebook storage memory, codeword memory, and arithmetic circuit may be held on a single integrated circuit substrate.

It is thus a feature of at least one embodiment of the invention to provide for sufficient compression that energy costs of transferring data to an integrated circuit can be substantially reduced.

These particular objects and advantages may apply to only some embodiments falling within the claims and thus do not define the scope of the invention.

DETAILED DESCRIPTION OF THE PREFERRED EMBODIMENT

Hardware Overview

Figure 1:
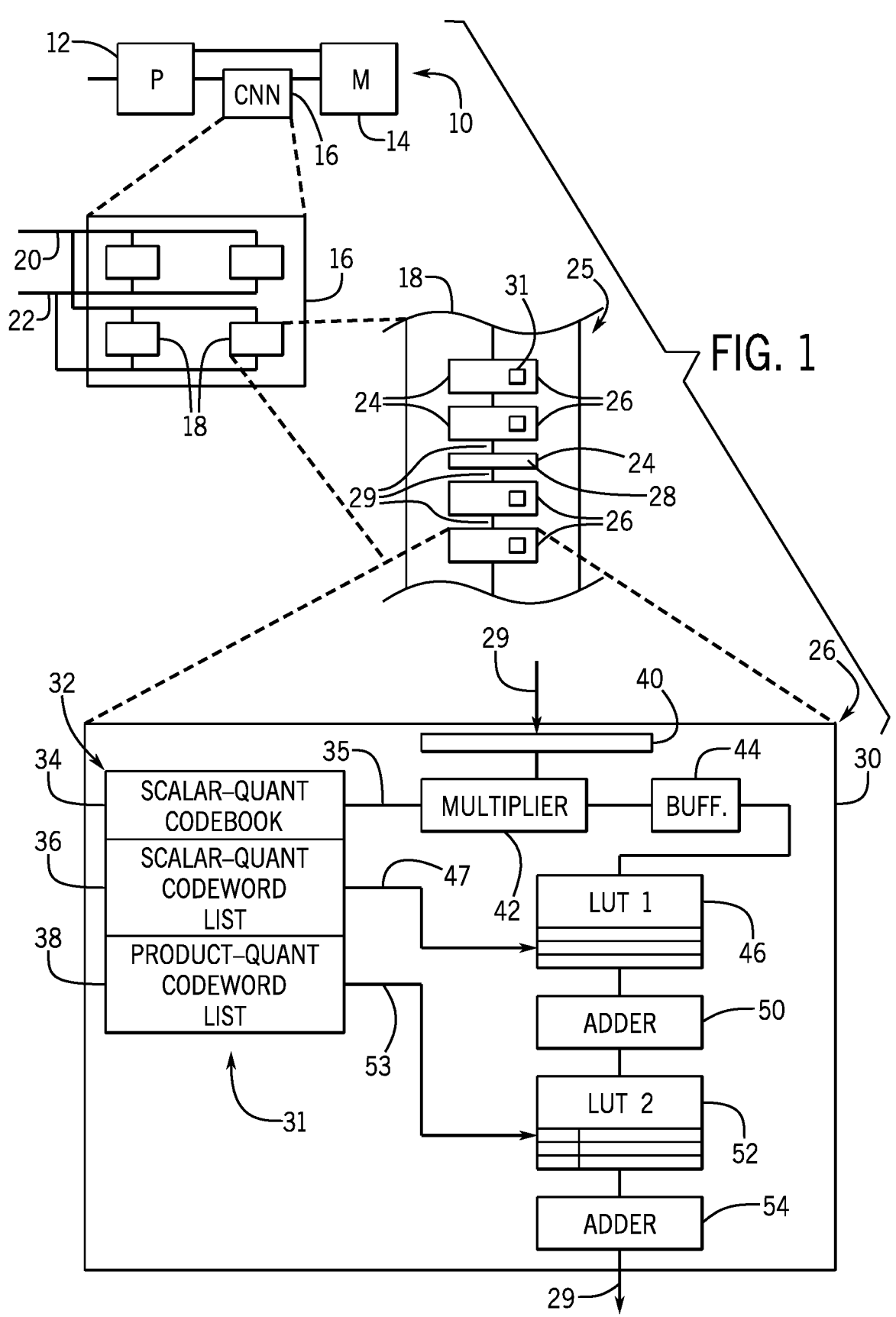
FIG. 1 is a block diagram of a neural network processor of the present invention with a set of successively exploded fragmentary details showing compute engines each providing a processing element allowing on-chip storage of kernel weights.

Referring now to FIG. 1, a computer system 10 may provide for a general-purpose processor 12, for example, a von-Neuman type architecture computer executing a general instruction set and possibly using out-of-order and speculative execution of the type commonly used in current cell phones and desktop computers. The general-purpose processor 12 may communicate with memory 14 optionally including multiple memory technologies arranged in a hierarchical fashion including, for example, SRAM and DRAM and/or so-called flash memory.

The memory 14 and general-purpose processor 12 may communicate with a special-purpose neural network processor 16 implementing a convolutional neural network architecture for processing data, for example, received from the memory 14 directly or via the processor 12.

The neural network processor 16 may include multiple compute engines 18 which together or individually maybe fabricated on a single integrated circuit substrate using known integrated circuit fabrication techniques. Each compute engines 18 receives input data, for example, by means of a shared input bus 20 from the general-purpose processor 12 for memory 14 and in response provides classification output data by means of an output data bus 22, this output data, for example, classifying subject matter (e.g., pedestrian, automobile, truck, etc.) of those input images, such as may be useful in autonomous vehicle control. It should be noted that the invention is not intended to be limited to a particular type of input data, however, and the input data may likewise be any type of input data that may be usefully processed by a neural network system including other types of image processing, for example, for medical imaging or the like, text or spoken translation, etc.

Each compute engine 18 provides the capability of implementing multiple layers 24 of a convolutional neural network 25, including, for example, convolution layers 26 and pooling layers 28 of a type that are generally understood in the art. These convolution layers 26 are each associated with a kernel 31 (which is generally different for different convolution layers 26) and are comprised of neurons (not shown). The convolution layers 26 and the pooling layers 28 communicating inter-neuron data 29 therebetween represent outputs from the previous layer and inputs to a succeeding layer. In one embodiment, each compute engine 18 may execute a separate independent convolutional neural network 25 receiving different input data and providing different classifications according to different kernels 31.

Each convolution layer 26 of a compute engine 18 may be implemented by a processing element 30 to provide rapid execution of a neural network convolution as will now be described.

Referring still to FIG. 1, a processing element 30 will typically be implemented entirely on a single integrated circuit substrate and in that regard, will provide for an on-chip memory 32 for storage of a scalar-quantized codebook 34, a scalar-quantized codeword list 36, and product-quantized codeword list 38 as will be discussed in greater detail below. These storage structures for the "codebooks," for example, may be regarded logically as tables that may be indexed by corresponding "codewords."

Inter-neuron data 29 may be received by an input data register 40 of each processing element 30, the former holding a vector of input data generally obtained from a multidimensional input data matrix (not shown in FIG. 1 but to be discussed below with respect to FIG. 4) that has been "flattened" into a vector by a scanning through the matrix of input data in a predefined pattern, such as a raster scan, through each of its dimensions.

Data from the input data register 40 may be received by a multiplier array 42 of the processing element 30 providing vector multiplication of the data of the input register 40 with a corresponding vector 35 of the scalar-quantized codebook 34 whose contents will be described below. The result of this multiplication provides a set of building block products that will be used (and reused) in calculation of the dot product between a convolution kernel 31 and the input data from the input data register 40 as will be discussed in greater detail below.

Figure 4:
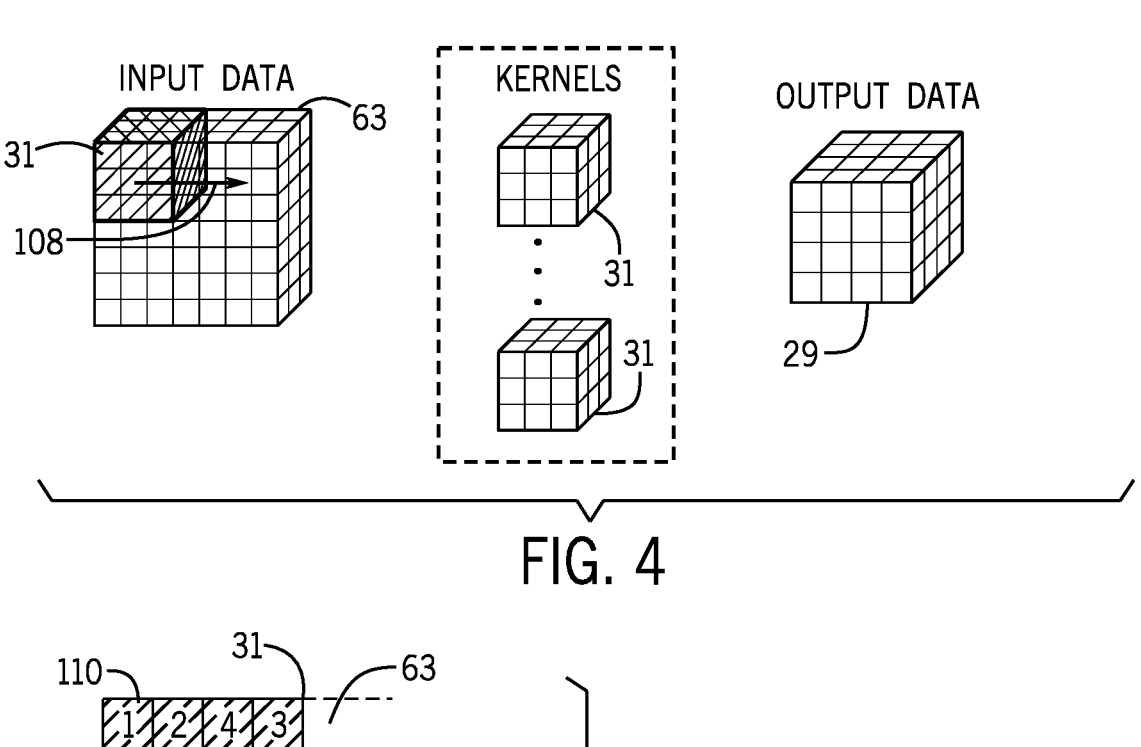
FIG. 4 is a diagrammatic representation of the convolution process of a convolutional neural network showing movement of the kernel data over the data to be processed.
Figure 5:
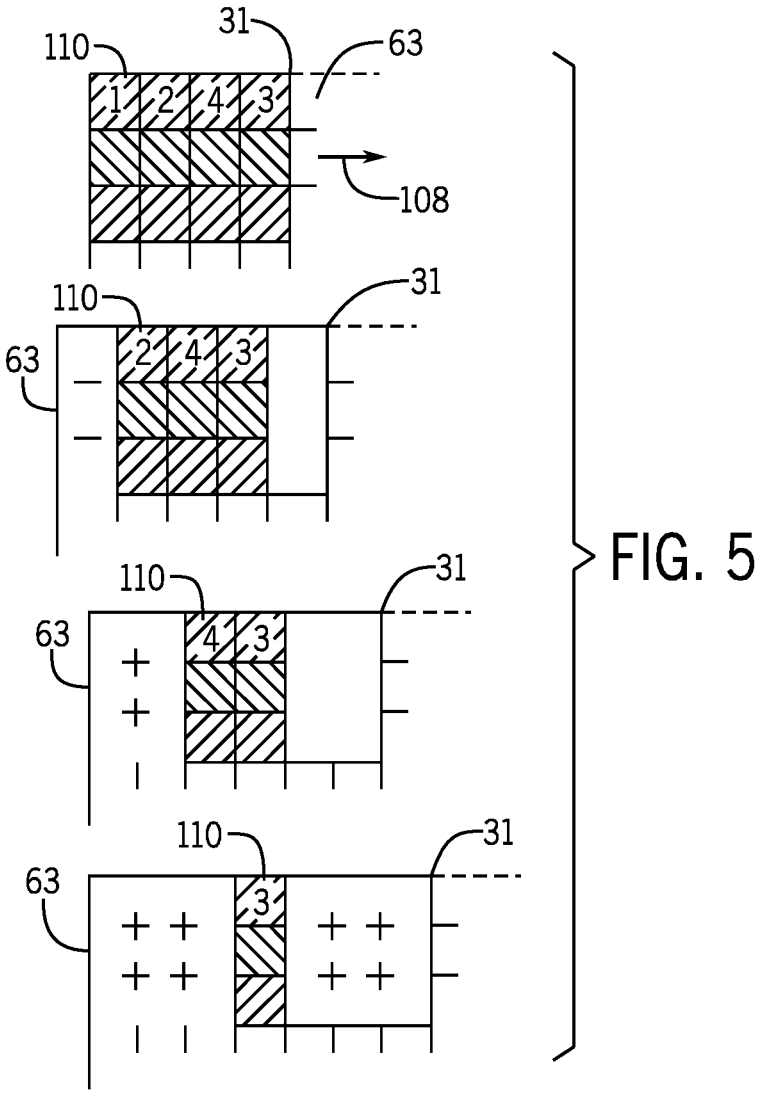
FIG. 5 is a two-dimensional representation of the convolutional process showing data retention for reuse as practiced by the present invention.

These products from the multiplier array 42 may be buffered by a line buffer 44 or other memory structure for providing the data reuse discussed in FIGS. 4 and 5 and used to populate a first lookup table 46 generally holding precalculated multiplication (product) values.

A scalar-quantized codeword 47 from the scalar-quantized codeword list 36 may then be used to index through the lookup table 46 to select certain products to be added together by an adder tree 50 to populate a second lookup table 52 holding pre-calculated partial sums that will also be used in the calculation of the dot product by the processing element 30.

The second lookup table 52 may be indexed by product quantization codewords stored in the product-quantized codeword list 38 to provide partial sums to an adder tree 54 which produces a dot product of the received inter-neuron data 29 and a convolution kernel 31, the latter collectively represented by scalar-quantized codebook 34, scalar-quantized codeword list 36, and product-quantized codeword list 38 to provide output, inter-neuron data 29'.

Detailed Operational Description

Figure 2:
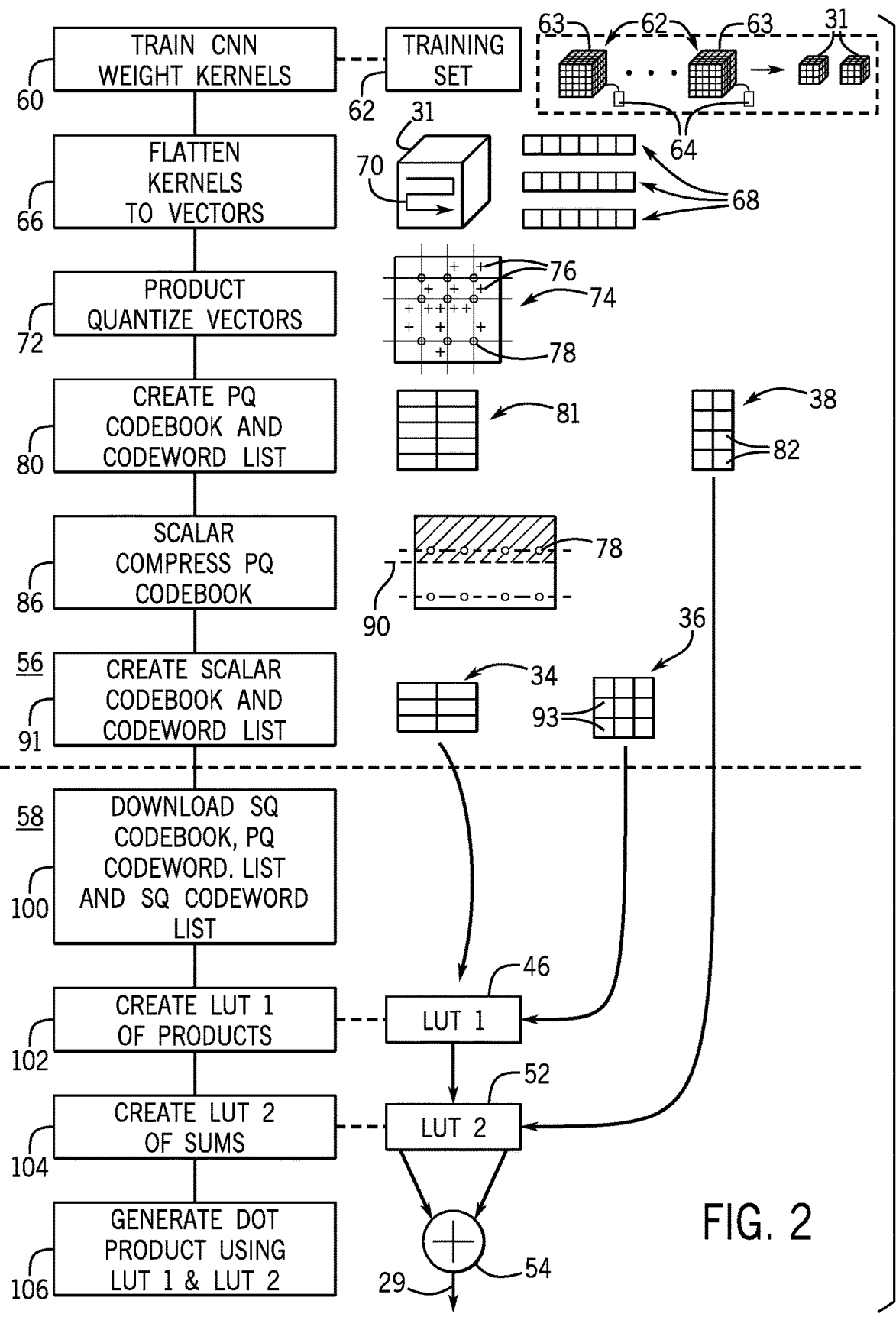
FIG. 2 is a flowchart showing on-line and off-line processing steps for use of the architecture of claim 1.

Referring now to FIG. 2, the hardware of FIG. 1 requires an off-line preparation of neural network kernels 31 (indicated generally by process blocks in off-line region 56) followed by a downloading of this kernel 31 to the hardware FIG. 1 (specifically to memory 32) and execution during an on-line process (indicated generally by process blocks in on-line region 58).

At a first off-line process block 60, a convolutional neural network 25 (following the architecture implemented by compute engines 18 of FIG. 1) may be trained using a training set 62 according to conventional training techniques for convolutional neural networks. In such training, the convolutional neural network 25 is presented with multiple sets of input data 63 tagged with classification information 64 for each particular set. For example, the input data 63 may be image data having pixel values distributed in an x-y plane, each pixel having different colors representing a z-dimension of a three-dimensional data matrix. The classification information 64, for example, may identify a subject matter of the image, for example, "automobile" or "pedestrian" as discussed above.

The result of this training is to generate a set of kernels 31 providing weights for the convolutional neural network 25 so that the convolutional neural network 25 may operate with novel image data to successfully identify the subject matter of that image data among particular different categories of classification information 64. Each of the kernels 31 is typically a smaller matrix of data having a depth equal to that of the input data 63 but being substantially smaller in the other (x-y) dimensions.

At process block 66, the kernel 31 is flattened into a set of vectors 68 by effectively unwinding the three-dimensional data of the kernel 31 in a raster pattern 70. In one embodiment, each of vector 68 may comprise one full row of data of the kernel 31 with each vector starting at a leftmost edge of the matrix of the kernel 31 and preceding the full width of that kernel data in left to right order. The invention contemplates other methods of flattening the kernel 31 that generally preserve the orientation and alignment of the vector data including along columns or depth values.

At process block 72, the vectors 68 of a single kernel 31 are mapped to a multidimensional space 74 having a number of dimensions equal to the length of the vectors so that each vector may be described by a single data point 76 in that space. A limited set of centroid values 78 are then selected within clusters of the data points 76 in the multidimensional space 74 to minimize the Euclidean distance between the data points 76 of that cluster and a given centroid 78. The dimension values defining each centroid 78 may be separated into groupings that describe each centroid 78 as a product of the dimension values of those groupings. In this example, a simplified two-dimensional space 74 is shown, and the product is between a first grouping of horizontal dimensions and a second grouping of vertical dimensions of each centroid 78 that together define the centroid 78. The centroids 78 may be aligned along rows and columns so that a limited number of product elements may be used to describe a large number of centroids resulting in a substantial compression. In this process, the centroids 78 are effectively quantized to a row or column; however, the rows and columns need not be equally spaced in the horizontal or vertical dimensions as will be evident from the following example. Clustering techniques using this approach are known in the art.

Figure 3:
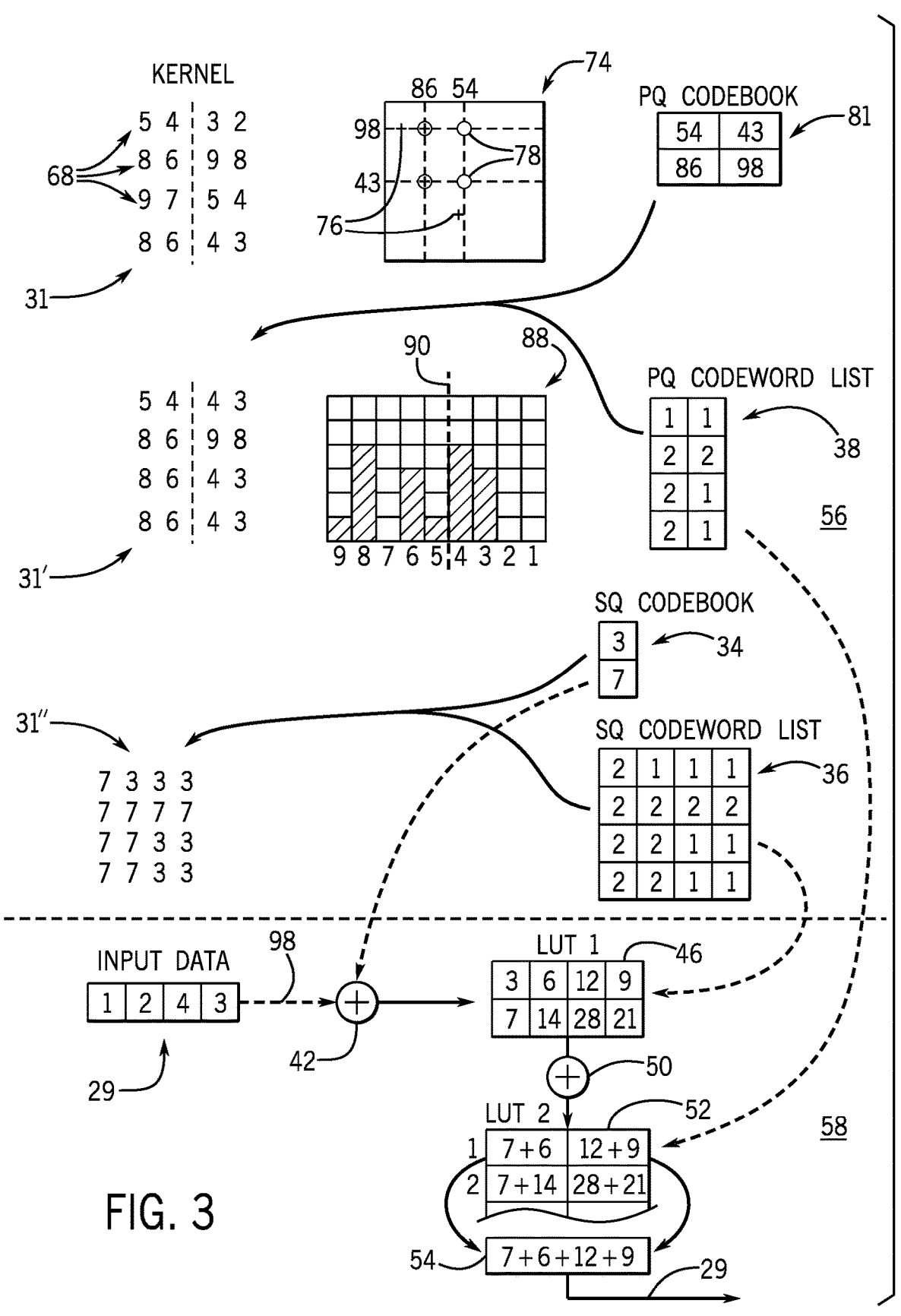
FIG. 3 is a simplified example of programming of the neural network processor and its operation according to the flowchart of FIG. 2.

Referring now momentarily to FIG. 3, an example simplified kernel 31 may provide four input vectors 68 each representing one row of an image matrix (for example) as follows:

5432
8698
9754
8643

Each of these vectors 68 may be represented in two-dimensional space 74 as data points 76. In this case, the clustering may create centroids 78 quantized along a horizontal axis with values of 86 and 54 (partial vectors) and quantized along a vertical axis with values of 98 and 43 (partial vectors). Generally, a limited number of centroids 78 will approximate a much larger number of points 76 providing a first opportunity for compression, and a limited number of partial vectors will describe a larger number of centroids 78 providing a second opportunity for compression.

Referring to both FIGS. 2 and 3, at process block process block 80 a "product-quantized codebook" 81 is then developed using this vector decomposition providing an index "codeword" value 82 linked to partial vectors, in this example being either the horizontal or vertical values of the centroids 78. In this example, a codeword of 1 is linked to the partial vector of 54 in the horizontal dimension and to a partial vector of 43 in the vertical dimension. Likewise, a codeword of 2 is linked to the partial vector of 86 in the horizontal dimension and a partial vector of 98 in the vertical dimension. These codeword values 82 can be used to create a product-quantized codeword list 38 which together with the product-quantized codebook 81 could be used to reconstitute a compressed kernel 31' providing the following values:

5443
8698
8643
8643

It will be seen that this compressed kernel 31' only approximates the values of the kernel 31 per the quantization shown above of clustering and product quantization.

At process block 86 of FIG. 2, the values of the compressed kernel 31 may be further compressed by a scalar compression in which each digit of the compressed kernel 31 is compared to a limited set of ranges to provide a further compression. In this example, the digits of the partial vectors are compressed from ten possibilities (0-9) to two possibilities that best represent the digit before compression.

Determining the scalar threshold for this scalar quantization may be done, for example, by generating a histogram 88 of all of the digits of the compressed kernel 31' and providing a threshold value 90 (in this case 4) equally partitioning those values into two ranges: (1) a first range for values greater than 4 or (2) a second range for values less than or equal to 4. Each of these partial vectors within these ranges will be associated with a predefined centroid value (e.g., 3 or 7) completing the compression in which each digit of the partial vector becomes either a 3 or 7.

The result is a scalar-quantized codebook 92 formed at process block 91 and having two codeword values of (3, 7). This codebook 92 together with a scalar-quantized codeword list 36 of codeword values 93 and a generator using the threshold value 90 on the scalar compressed kernel 31' allows reconstruction of a highly compressed kernel 31" as follows:

7333
7777
7733
7733

While this simple example substantially modifies the highly compressed kernel 31' with respect to the kernel 31 (shown above), this compression system reduces the amount of data necessary to express the kernel 31 to point where it can be stored practically on the same integrated circuit as implements the neural network. Specifically, only the scalar-quantized codebook 34 and the scalar-quantized codeword list 36 need to be downloaded to the processing element 30, although practically the product-quantized codeword list 38 is also downloaded as will be discussed below. Practically this represents a substantial compression of the kernel 31 for realistic sizes of kernel 31. Consider, for example, if the weights of the kernel 31 were each represented by a 32-bit floating-point value. Even in this simple example of a 16-column and 16-row kernel 31, that would represent over 4000 bits of data. In contrast the scalar codebook 92 can be represented with two 32-bit floating-point values (more typically there is compression to an integer value), and the product-quantized codeword list 38 and scalar-quantized codebook 34 can be represented with eight and sixteen additional bits of data respectively for a total of 88 bits.

Referring now to FIGS. 2 and 3, the scalar-quantized codebook 92, the scalar-quantized codeword list 36, and the product-quantized codeword list 38 are downloaded into the memory 32 of the processing element 30 engine as indicated by process block 100 to begin the processing steps of the on-line region 58 implemented by the neural net processor 16.

Referring now to FIGS. 1, 2, and 3, in overview, the processing element 30 receives input data of inter-neuron data 29 flattened into a vector 98 and takes the dot product of this vector 98 with a similar vector formed by flattening the kernel 31. In this simple example, the input vector 98 may be represented by the vector (1, 2, 4, 3) multiplied by the first row of the kernel 31 being the vector (5, 4, 3, 2) in the original kernel 31, or in this case, the highly compressed kernel 31" (7, 3, 3, 3). It will be understood that the desired dot product in this case will be represented by the following equation: $(7 \times 1) + (3 \times 2) + (3 \times 4) + (3 \times 3)$.

At process block 102, the scalar-quantized codebook 92 (3, 7) is multiplied by the current input vector 98 to populate the first lookup table 46 with all possible products that may be necessary in the dot product to be performed on the input, inter-neuron data 29 with the kernel 31. Note that the kernel 31" need not in fact be reconstituted or stored in the memory 32. By preparing this lookup table 46, time- and energy-consuming multiplications can be avoided by reuse of previous multiplications as will be seen.

At process block 104, the second lookup table 52 may be populated by using the precalculated product values of lookup table 46 applied to the scalar-quantized codeword list 36 to produce partial sums. Like the precalculated product values of lookup table 46, these precalculated partial sums may be reused in dot product calculations.

In this example, the top row of the scalar-quantized codeword is (2, 1, 1, 1) indicating that the necessary partial sums are (7+6) (selecting from the second row of the first column of lookup table 46 and the first row of the second column of lookup table 46 per the first two digits of the scalar-quantized codeword) and (12+9) (selecting from the first row of the third column of lookup table 46 and the first row of the fourth column of lookup table 46).

At process block 106 these partial products are then added together by adder tree 54 to produce the dot product providing a portion of the output, inter-neuron data 29. The remainder of the output, inter-neuron data 29 will be computed as additional vectors 98 are received associated with the remaining rows of the kernel 31".

Although not evident in this abbreviated example, this process of creating the lookup tables 46 and 52 reduces unnecessary arithmetic operations as additional input vectors 98 come in and, for example, are multiplied by the second row of the highly compressed kernel 31" for which all the necessary multiplications have been completed shown in FIG. 3 in a second row of the lookup table 52 which reuses, for example, the product 7.

Referring now to FIGS. 3 and 4, in addition to the reuse of multiplications and additions for a given location of the kernel 31 with respect to the input data 63, these operations can be reused as kernel 31 is convoluted as indicated by arrow 108 over the input data 63 (or previous inter-neuron data 29 from an earlier layer) by appropriate buffering, shifting, or refreshing of the memories of lookup tables 46 and 52. Thus, for example, the lookup table values 110 (shown in FIG. 5) associated with the lookup table 46 for the above example of input vector (1, 2, 4, and 3) will have relevance as the kernel 31 moves successively rightward for up to three successive moves (the width of the kernel in the convolution direction). Similarly, some calculations can be reused for subsequent scans of the kernel 31 displaced downward from that as depicted. This reuse can be selectively performed to implement a trade-off between speed and the necessary size of the lookup tables 46 and 52 or a buffer associated with them.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A neural network processor operating to receive data and to classify that data comprising:
   an input register holding received data for classification according to a kernel of multiple kernel weight values of a neural network trained to provide a set of classifications;
   a codebook storage memory holding data permitting a mapping of individual codeword values each, to a pattern of multiple kernel weight values;
   a codeword memory holding codeword data to provide generation of a reconstructed kernel reconstructing the kernel by indexing the codebook storage memory with codeword data;
   arithmetic circuitry communicating with the input register, the codebook storage memory, and the codeword memory to generate output representing a dot product between the received data and the reconstructed kernel to classify the received data according to the set of classifications using the reconstructed kernel; and
   wherein the input register, codebook storage memory, codeword memory, and arithmetic circuit are held on a single integrated circuit substrate.

2. The neural network processor of claim 1 wherein the patterns of multiple kernel weight values are contiguous weight values within a matrix of the kernel.

3. The neural network processor of claim 2 wherein the patterns of multiple kernel weight values are contiguous weight values along a predetermined dimension of the kernel data.

4. The neural network processor of claim 3 wherein the patterns of multiple kernel weight values have beginning and end values aligned within the matrix of the kernel.

5. The neural network processor of claim 4 wherein the beginning and end values extend at least a full extent of a dimension of the matrix of the kernel.

6. The neural network processor of claim 1 wherein the reconstructed kernel is a scalar compression of the kernel of the neural network trained to provide the set of classifications.

7. The neural network processor of claim 6 wherein the scalar compression replaces a range of kernel data values with a predetermined scalar value.

8. The neural network processor of claim 1 wherein the patterns of multiple kernel weight values are a product quantization of vectors of the kernel of the neural network trained to provide a set of classifications.

9. The neural network processor of claim 8 wherein the product quantization provides multiple individual codeword values associated with different but contiguous patterns of multiple kernel weights.

10. The neural network processor of claim 1 wherein the arithmetic circuitry employs the data of the codebook storage memory to precompute a set of multiplications between the received data and data of the codebook storage memory to populate a first lookup table and repeatedly uses the precomputed set of multiplications according to data of the codeword memory in generation of the output representing a dot product between the received data and the reconstructed kernel.

11. The neural network processor of claim 10 wherein the arithmetic circuit further includes a second lookup table and further operates to populate the second lookup table with sums formed using the data of the codeword storage memory and the first lookup table and uses the second lookup table to form the dot product.

12. The neural network processor of claim 11 wherein the codebook storage memory holds a scalar-quantized codebook that can be reconstructed into a product-quantized codebook using scalar-quantized codewords of the codeword memory, and wherein the product-quantized codebook can be reconstructed into a kernel using product-quantized codewords stored in the codeword memory.

13. The neural network processor of claim 11 wherein the data of the first and second lookup tables are stored for reuse between successive received data separated by a convolution of the kernel on an input data set.

\* \* \* \* \*